Dec. 25, 1923.                                   1,478,498
                  H. F. WILLKIE
         METHOD OF MANUFACTURING ALKYL ESTERS
                 Filed Dec. 29, 1921
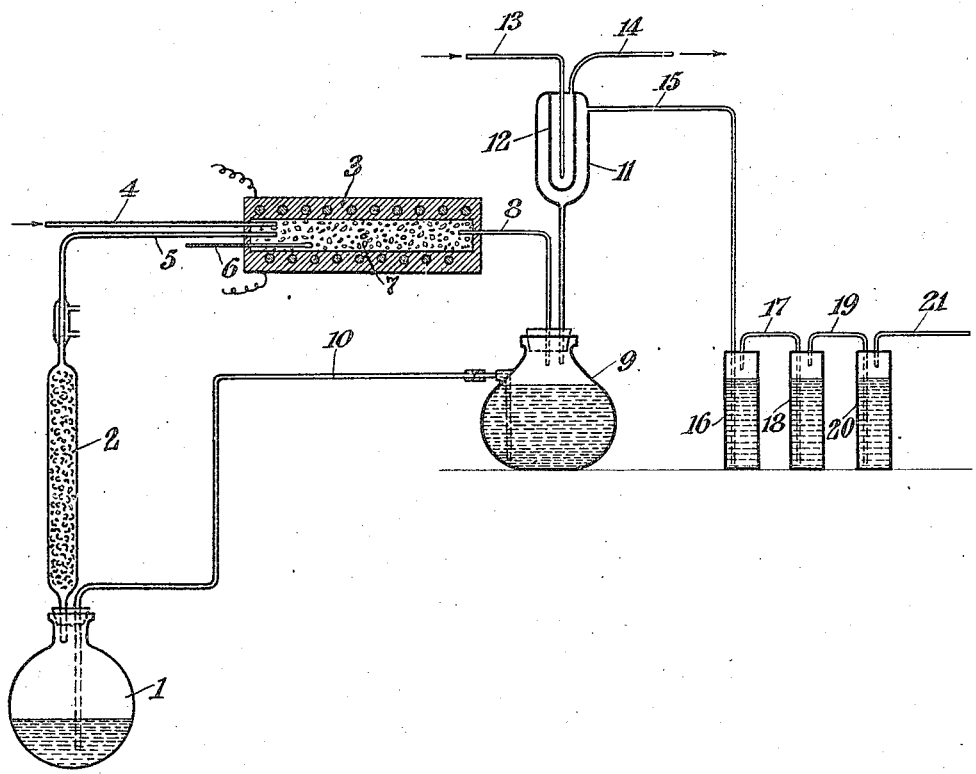

Patented Dec. 25, 1923.

1,478,498

UNITED STATES PATENT OFFICE.

HERMAN F. WILLKIE, OF BALTIMORE, MARYLAND, ASSIGNOR TO U. S. INDUSTRIAL ALCOHOL CO., A CORPORATION OF WEST VIRGINIA.

METHOD OF MANUFACTURING ALKYL ESTERS.

Application filed December 29, 1921. Serial No. 525,758.

*To all whom it may concern:*

Be it known that I, HERMAN F. WILLKIE, a citizen of the United States, a resident of Baltimore, State of Maryland, have invented a certain new and useful Method of Manufacturing Alkyl Esters, of which the following is a specification.

This invention relates to a method of manufacturing alkyl esters.

An object of the invention is to avoid the accumulation of water in the catalytic or dehyrdrating agent used when preparing the products from acids and alcohols while obtaining a high yield and while operating in a continuous manner. A further object of the invention is to avoid the clogging of the catalytic agent which has been experienced in prior processes. A still further object of the invention is to avoid the presence of acid in the condensers and other parts of the apparatus connected to the reaction vessel.

The process may be conducted in various forms of apparatus but for the sake of a specific embodiment the following apparatus will be described:—

The figure of the drawing illustrates a simple type of apparatus for carrying out the process of this invention.

In said figure is shown a still 1 connected to a rectification column 2 which is filled with fragments of inert material such as glass beads. An electric heater 3 is supplied with a tube 4 for the admission of hydrochloric acid vapors and with a tube 5 connected to the column 2. A thermometer 6 is also inserted into the electric heater 3. The electric heater which is heated by a suitable current of electricity passing through resistance coils 7 contains fragments and particles of coke impregnated with a catalyst such as zinc chloride for example. A tube 8 leads therefrom to a partial condenser 9 provided with a siphon 10 for removing the water and alcohol condensed and also provided with a condenser 11 cooled by a chamber 12 into which water or other cooling medium flows through a pipe 13 and leaves by a pipe 14. The siphon 10 leads back to the flask 1 wherein the mixture of alcohol and water, is rectified in order to provide approximately 95% alcohol for the interaction chamber 3. The condenser 11 is connected by a pipe or tube 15 to a wash bottle 16 containing water and there are two other wash bottles 18 and 20 connected by pipes 17 and 19 respectively and respectively filled with sodium hydroxide solution comprising 10 parts by weight of sodium hydroxide dissolved in 100 parts by weight of water, and concentrated sulphuric acid having a strength of over 70%, preferably over 90%. The strength of the sodium hydroxide may vary considerably from a 10% solution. The pipe 21 leads from the bottle 20 to a condenser for condensing the product formed.

In the operation of this apparatus alcohol is distilled from the rectifier 2 while hydrochloric acid vapors are led in through the pipe 4 into the heater 3 where the interaction takes place in the presence of the catalyst such as zinc chloride contained in the particles of coke, which provides a large surface for the catalyst even in case the latter should at times fuse. The water formed during the interaction between the acid and alcohol is extracted by the catalyst or dehydrator but is almost immediately expelled again by reason of the high temperature prevailing which does not permit condensation of the water. The latter together with the other gaseous products passes out through the pipe 8 into the flask 9 wherein the water and alcohol are condensed and constantly siphoned off through the pipe 10 while the remaining gases pass up into condenser 11 where any remaining water vapor is condensed together with most of the uncombined alcohol and acid. The ester passes out through the pipe 15 and is washed free of acid in the bottle 16, any traces of acid remaining being eliminated in the bottle 18. The ester passes along through the pipe 19 and is dried in the bottle 20 after which it is in pure condition and may be led to any suitable condenser or other receiving means.

It is an advantage to keep the acid and alcohol separate until they arrive in the interaction zone for by this means the formation of esters is avoided. The temperatures in the electric heater 3 are preferably between 140 and 160° C. so as to insure the expulsion of the water. Catalysts and dehydraters other than zinc chloride may be used but the latter is preferable. It is advisable to maintain an excess of about 10% of alcohol in order to avoid the passage of acid vapors into the other parts of the apparatus and the excess alcohol may be condensed as it passes from the catalyzer tube and led back continuously to the rectifier 2. It is desirable to keep the zinc chloride dry at all times during the production of the ester since this will insure the maximum yields. The latter under the best practices of the process may run as high as 85% of the alcohol used. The washers 16, 18 and 20 may be dispensed with and the product may be recovered by fractionation from the mixture of alcohol, acid and ester, which would be condensed in that event.

The process of this invention is of general application to cases where it is desired to prepare an ester or similar compound from an acid and an alcohol by elimination of one or more molecules of water. Wherever several compounds may be condensed to form a new compound the process may find application by those skilled in the art, the process being obviously capable of variation to suit the peculiarities of particular starting materials. Compounds having the OH group capable of union with the H of another compound, may be operated upon by this process, for example the monohydric alcohols. The polyhydric alcohols may in suitable cases be used. Among the compounds capable of detaching nascent H may be named the acids and acid anhydrides such as nitric acid and the nitrogen oxides, $SO_3$ and $SO_2$, phthalic anhydride, volatile alifatic and aromatic acids and their volatile anhydrides, and acetic acid and its anhydride. Anhydrides of the alcohols may also be combined with the acids, for example ether, ethylene, propylene, and propyl ether. By the term "acid" in the claims it is intended to include the acid anhydrides and acid-like bodies capable of condensation with a hydroxy group, and by the term "alcohol" it is intended to include the alcoholic anhydrides.

As many apparently widely different embodiments of this invention may be made without departing from the spirit thereof, it is to be understood that I do not intend to limit myself to the specific embodiment thereof except as indicated in the appended claims.

I claim:

1. The method of manufacturing alkyl esters comprising allowing an acid and an excess of an alcohol to interact in a gaseous state in the presence of a solid catalyst maintained at a temperature sufficient to drive off the water formed during the interaction.

2. The method of manufacturing alkyl esters comprising allowing an acid and an excess of an alcohol to interact in a gaseous state in the presence of a catalyst carried on an inert carrier, at a temperature above the vaporizing point of the water formed.

3. The method of manufacturing alkyl esters comprising allowing an acid and an excess of an alcohol to interact in a gaseous state in the presence of a catalyst maintained at a temperature sufficient to drive off the water formed, condensing the excess of the alcohol, and returning it to the process.

4. The method of manufacturing alkyl esters comprising allowing an acid and an excess of an alcohol to interact in a gaseous state in the presence of a catalyst maintained at a temperature sufficient to drive off the water formed, condensing the water formed and the excess alcohol, rectifying the mixture, and returning the alcohol to the process for reuse.

5. The method of manufacturing alkyl esters comprising allowing an acid and an excess of an alcohol to interact in the gaseous state in the presence of a catalyst maintained at a temperature sufficient to drive off the water formed, and recovering the excess alcohol for reuse in the process.

6. The method of manufacturing alkyl esters comprising allowing an acid and an alcohol to interact in a gaseous state within an electric furnace containing particles of an inert carrier carrying a catalyst, and maintaining the furnace at a temperature sufficient to drive off the water formed.

7. The method of manufacturing alkyl esters comprising allowing an acid and an excess of an alcohol to interact in a gaseous state in the presence of a catalyst maintained at a temperature sufficient to drive off the water formed.

8. The method of manufacturing alkyl esters comprising allowing an acid and an alcohol to interact in a gaseous state within an electric furnace containing particles of coke impregnated with zinc chloride, and maintaining the furnace at a temperature sufficiently high to drive off the water formed during the interaction.

9. The method of manufacturing alkyl esters comprising allowing an acid and an excess of an alcohol to interact in a gaseous state within an electric furnace containing particles of coke carrying zinc chloride, maintaining the furnace at a temperature sufficiently high to drive off the water formed during the interaction, condensing the water and the excess alcohol, rectifying the mixture, and returning the alcohol to the process.

10. The method of manufacturing alkyl esters comprising allowing a halogen acid and a monohydric alcohol to interact in the presence of a solid catalyst maintained at a temperature sufficient to drive off the water formed during the interaction.

11. The method of manufacturing alkyl esters comprising allowing a halogen acid and an excess of a monohydric alcohol to interact in a gaseous state in the presence of a catalyst carried on an inert carrier, at a temperature above the vaporizing point of the water formed.

12. The method of manufacturing alkyl esters comprising allowing a halogen acid and an excess of a monohydric alcohol to interact in a gaseous state in the presence of a catalyst maintained at a temperature sufficient to drive off the water formed, condensing the excess of the alcohol, and returning it to the process.

13. The method of manufacturing alkyl esters comprising allowing a halogen acid and a monohydric alcohol to interact in a gaseous state within an electric furnace containing particles of an inert carrier carrying a catalyst, and maintaining the furnace at a temperature sufficient to drive off the water formed.

14. The method of manufacturing alkyl esters comprising allowing a halogen acid and an excess of a monohydric alcohol to interact in a gaseous state within an electric furnace containing particles of coke carrying zinc chloride, maintaining the furnace at a temperature sufficiently high to drive off the water formed during the interaction, condensing the water and the excess alcohol, rectifying the mixture, and returning the alcohol to the process.

15. The method of manufacturing ethyl chloride comprising allowing gaseous hydrochloric acid and an excess of gaseous ethyl alcohol to interact in the presence of a catalyst maintained at a temperature sufficiently high to drive off the water formed.

16. The method of manufacturing ethyl chloride comprising allowing gaseous hydrochloric acid and an excess of gaseous ethyl alcohol to interact in the presence of particles of coke impregnated with zinc chloride, and maintaining the latter at a temperature sufficiently high to drive off the water formed during the interaction.

In testimony that I claim the foregoing, I have hereunto set my hand this 15 day of December, 1921.

HERMAN F. WILLKIE.